US012749681B2

(12) United States Patent
Choi et al.

(10) Patent No.: US 12,749,681 B2
(45) Date of Patent: Sep. 29, 2026

(54) LITHIUM BATTERY CATHODE ACTIVE MATERIAL HAVING ORIENTED STRUCTURE, AND PREPARATION METHOD THEREFOR

(71) Applicant: POSCO FUTURE M CO., LTD, Gyeongsangbuk-Do (KR)

(72) Inventors: Seung Un Choi, Gyeongsangbuk-Do (KR); Jae Han Kim, Daejeon (KR); Deuk Su Kim, Gyeongsangbuk-Do (KR); Hye Jeong Park, Gyeongsangbuk-Do (KR); Jeong Han Kim, Gyeongsangbuk-Do (KR)

(73) Assignee: POSCO FUTURE M CO., LTD, Gyeongsangbuk-Do (KR)

( * ) Notice: Subject to any disclaimer, the term of this patent is extended or adjusted under 35 U.S.C. 154(b) by 596 days.

(21) Appl. No.: 18/254,519

(22) PCT Filed: Nov. 23, 2021

(86) PCT No.: PCT/KR2021/017235

§ 371 (c)(1),
(2) Date: May 25, 2023

(87) PCT Pub. No.: WO2022/114718

PCT Pub. Date: Jun. 2, 2022

(65) Prior Publication Data

US 2024/0030431 A1 Jan. 25, 2024

(30) Foreign Application Priority Data

Nov. 25, 2020 (KR) ........................ 10-2020-0159510

(51) Int. Cl.
*H01M 4/525* (2010.01)
*C01G 53/50* (2025.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC .................................................... H01M 4/525
See application file for complete search history.

(56) References Cited

U.S. PATENT DOCUMENTS 9,093,712 B2 7/2015 Kato et al.
9,337,487 B2 5/2016 Sun et al.
(Continued)

FOREIGN PATENT DOCUMENTS

CN 104993122 A 10/2015
CN 107004852 A 8/2017
(Continued)

*Primary Examiner* — Brian R Ohara
(74) *Attorney, Agent, or Firm* — Young Basile Hanlon & MacFarlane, P.C.

(57) ABSTRACT

A lithium battery cathode active material and a preparation method therefor are described. The material has an orientation formed by firing a density gradient precursor in which the density gradually changes from the inside of second particles, formed as an aggregate of primary particles, to the outside of the particles. The lithium battery cathode active material has an oriented structure, and thus can have a long lifespan and high-capacity characteristics.

8 Claims, 4 Drawing Sheets

(51) Int. Cl.
*H01M 4/02* (2006.01)
*H01M 4/505* (2010.01)

(52) U.S. Cl.
CPC ...... *C01P 2002/50* (2013.01); *C01P 2004/03* (2013.01); *C01P 2004/50* (2013.01); *C01P 2004/61* (2013.01); *C01P 2006/12* (2013.01); *C01P 2006/40* (2013.01); *H01M 2004/021* (2013.01)

(56) References Cited

U.S. PATENT DOCUMENTS

| | | | | |
|---|---|---|---|---|
| 2006/0105239 | A1* | 5/2006 | Paulsen ............. | H01M 4/13915 429/223 |
| 2014/0158932 | A1* | 6/2014 | Sun ......................... | H01M 4/13 252/182.1 |
| 2016/0359165 | A1 | 12/2016 | Kim et al. | |
| 2020/0119351 | A1* | 4/2020 | Yun ........................ | H01M 4/525 |
| 2021/0234155 | A1 | 7/2021 | Jeong et al. | |

FOREIGN PATENT DOCUMENTS

| | | | |
|---|---|---|---|
| CN | 111056577 | A | 4/2020 |
| JP | 2017-533571 | A | 11/2017 |
| KR | 10-2013-0138073 | A | 12/2013 |
| KR | 101593401 | B1 | 2/2016 |
| KR | 10-2018-0010122 | A | 1/2018 |
| KR | 10-2019-0129518 | A | 11/2019 |
| KR | 102118289 | B1 | 6/2020 |
| WO | 2016/175597 | A1 | 11/2016 |
| WO | 2019/216694 | A1 | 11/2019 |

* cited by examiner

LITHIUM BATTERY CATHODE ACTIVE MATERIAL HAVING ORIENTED STRUCTURE, AND PREPARATION METHOD THEREFOR

TECHNICAL FIELD

The present disclosure relates to a cathode active material for a lithium battery and a preparation method therefor, the material having an orientation formed by firing a density gradient precursor, by which the density gradually changes from the inside to the outside of second particles formed of an aggregate of primary particles. The cathode active material for a lithium battery according to the present disclosure has an oriented structure and thus can have long lifespan and high-capacity characteristics.

BACKGROUND

With the technological development and demand increase for electric vehicles, the demand for secondary batteries as energy sources is rapidly increasing. Among these secondary batteries, lithium secondary batteries having a high energy density and voltage, a long cycle life, and a low self-discharge rate have been commercialized and widely used. A lithium nickel cobalt manganese composite oxide is used as a cathode active material for lithium secondary batteries, wherein cobalt provides a cathode active material having a high operating voltage and excellent rate characteristics. However, a cathode active material having a high cobalt content is expensive and thus has limitations in widespread use as a power source in a field of electric vehicles or the like. In addition, the recent rapid price increase of cobalt has resulted in gradually reducing the content of cobalt. As a result, there is required a solution capable of supplementing rate characteristics and lifespan.

As another method for improving stability of the cathode active material, a lithium transition metal oxide having a concentration gradient in which the concentrations of transition metal components gradually change from the surface to the inside of the cathode active material has been proposed. However, cathode active materials having a concentration gradient that have been developed so far have a problem in that the cathode active materials do not have a complete orientation from the inside to the surface of particles, and processing costs are high and quality control is difficult because a complicated process is used for orientation implementation.

SUMMARY

The present inventors conducted intensive efforts to prepare a cathode active material with low processing costs and a complete orientation to solve the problems of the conventional art. As a result, the present inventors confirmed that a cathode active material with improved capacity characteristics and lifespan characteristics as well as a complete orientation can be prepared by adding xylitol as a particle shape controller in the preparation of the cathode active material.

An aspect of the present disclosure is to provide a cathode active material with improved capacity characteristics and lifespan characteristics, wherein the cathode active material contains an aggregate of primary particles forming a secondary particle and has an orientation from the inside of the secondary particle to the outside of the secondary particle. The cathode active material according to the present disclosure has an orientation formed by firing a density gradient precursor, by which the density gradually changes from the inside to the outside of the secondary particle formed of the aggregation of the primary particles.

Another aspect of the present disclosure is to provide a method for preparing a cathode active material with improved capacity characteristics and lifespan characteristics prepared by the method.

The present disclosure provides a lithium secondary battery including a cathode active material with improved capacity characteristics and lifespan characteristics.

As used herein, the term "orientation" means that, by providing a density gradient precursor, by which the density continuously changes throughout the inner region of a secondary particle formed of an aggregate of primary particles, the density gradient is diffused during firing and the density gradually changes from the inside of the secondary particle to the outside of the secondary particle.

As used herein, the term "primary particle" refers to a primary structure of a single particle, and the term "secondary particle" refers to an aggregate resulting from the aggregation of a plurality of primary particles by physical or chemical binding of the primary particles.

The cathode active material for a lithium secondary battery according to the present disclosure has an orientation formed by firing a density gradient precursor, by which the density gradually changes from the inside to the outside of the secondary particle formed of the aggregation of the primary particles.

DETAILED DESCRIPTION

Figure 1:
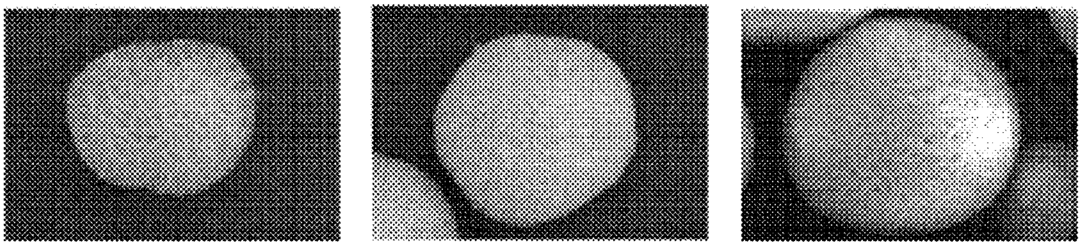
FIG. 1 shows SEM images of a density gradient precursor prepared by the method according to Example 1.
Figure 2:
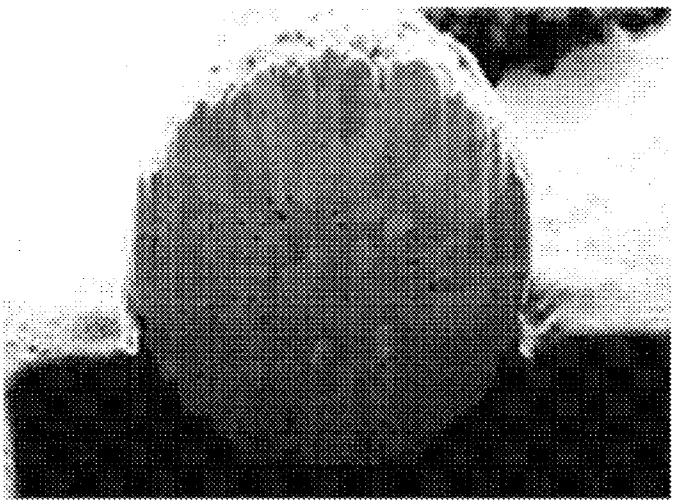
FIG. 2 shows an SEM image of a cross-section of an active material for a lithium secondary battery prepared by the method according to Example 1.
Figure 3:
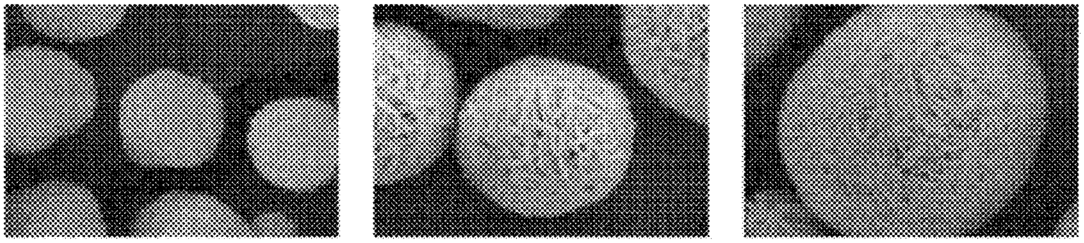
FIG. 3 shows SEM images of a density gradient precursor prepared by the method according to Example 2.
Figure 4:
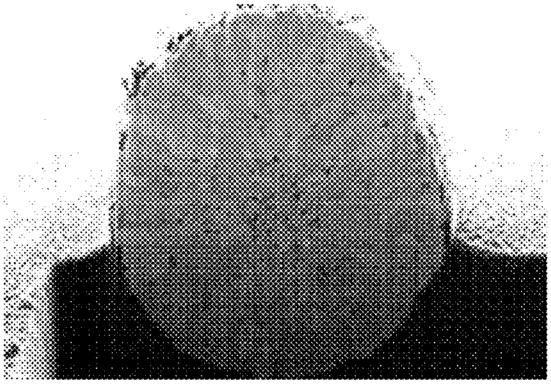
FIG. 4 shows an SEM image of a cross-section of an active material for a lithium secondary battery prepared by the method according to Example 2.
Figure 5:
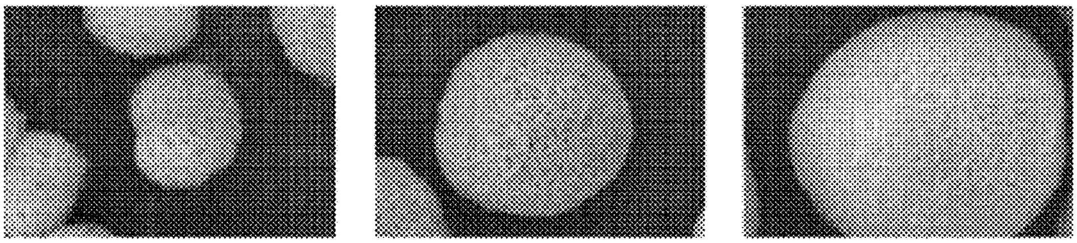
FIG. 5 shows SEM images of a density gradient precursor prepared by the method according to Comparative Example 1.
Figure 6:
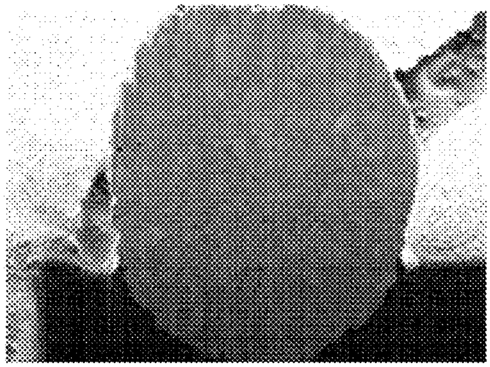
FIG. 6 shows an SEM image of a cross-section of an active material for a lithium secondary battery prepared by the method according to Comparative Example 1.

Hereinafter, a cathode active material for a lithium battery, which has an orientated structure and a method for preparing the same, according to specific embodiments of the present disclosure will be described in detail. However, the embodiment is provided only for an example of the invention. The scope of the invention is not limited to or by them, and it is obvious to a person skilled in the art based on the disclosure herein that various modifications are possible in the scope of the invention.

The following is a first embodiment of the present invention.

The present disclosure provides a cathode active material with improved capacity characteristics and lifespan characteristics, wherein the cathode active material may have an aggregate of primary particles forming a secondary particle and may have an orientation from the inside of the secondary particle to the outside of the secondary particle.

In the cathode active material with improved capacity characteristics and lifespan characteristics according to the present disclosure, the cathode active material has an orientation formed by firing a density gradient precursor, by which the density gradually changes from the inside to the outside of the secondary particle formed of the aggregation of the primary particles. In the cathode active material according to the present disclosure, a density gradient precursor, by which the density continuously changes throughout the inner region of the secondary particle is provided and as a result, the density gradient is diffused during firing and an orientation may be formed inside the cathode active material. The cathode active material having an oriented structure according to the present disclosure can improve output characteristics and lifespan characteristics of a secondary battery by reducing migration resistance of lithium in a lithium secondary battery.

In the cathode active material with improved capacity characteristics and lifespan characteristics according to the present disclosure, the primary particles may grow in an oriented form in a direction toward the surface from the center of the secondary particle, thereby forming the secondary particle with a spherical shape. The primary particles have a plate-shaped, needle-shaped, or amorphous particle form, but the shape is not limited thereto.

In the cathode active material with improved capacity characteristics and lifespan characteristics according to the present disclosure, the secondary particle may have a specific surface area of 1 to 30 $m^2/g$ and an average particle diameter ($D_{50}$) of 2 to 20 μm.

In the cathode active material with improved capacity characteristics and lifespan characteristics according to the present disclosure, the cathode active material may be composed of a composite oxide of lithium and a transition metal. The transition metal may be nickel, cobalt, manganese, or a mixture thereof.

In the cathode active material with improved capacity characteristics and lifespan characteristics according to the present disclosure, the cathode active material may be a lithium-nickel composite oxide represented by Formula 1 below:

$$Li_x[Ni_yCo_zMn_wM_v]O_2$$

where M is at least one selected from Ba, Ca, Zr, Ti, Mg, Ta, Nb, and Mo; and $0.9<x<1.2$, $0.8<y<1$, $0<z<0.8$, $0<w<0.05$, and $0\leq v\leq 0.2$.

The following is a second embodiment.

The present disclosure provides a method for preparing a cathode active material with improved capacity characteristics and lifespan characteristics, the method including:

(A) preparing a metal salt mixed aqueous solution containing a nickel-containing material, a cobalt-containing material, and a manganese-containing material;

(B) adding, to a reactor, a reaction solution containing the metal salt mixed aqueous solution and a complex ion former;

(C) adding a pH adjuster to the reaction solution in an inert atmosphere to adjust pH;

(D) filtering the reaction solution to obtain a metal composite hydroxide;

(E) mixing the metal composite hydroxide with a lithium source to prepare a cathode active material precursor; and (F) firing the cathode active material precursor, wherein step (A), (B), or (C) further includes adding a particle shape controller, and the cathode active material has an orientation formed by firing a density gradient precursor, by which the density gradually changes from the inside to the outside of a secondary particle formed of an aggregation of primary particles.

In the method for preparing a cathode active material according to the present disclosure, the particle shape controller may be a sugar or a sugar alcohol. For example, the sugar or sugar alcohol may be xylitol, mannitol, isomalt, sorbitol, maltitol, refined white sugar, lactose, inositol, erythritol, fructose, trehalose, ribitol, arabitol, galactitol, lactitol, maltotritol, or a combination thereof.

In the method for preparing a cathode active material according to the present disclosure, the nickel-containing material may include a nickel-containing acetate, nitrate, sulfate, halide, sulfide, hydroxide, oxide or oxyhydroxide. For example, the nickel-containing material may be $Ni(OH)_2$, NiO, NiOOH, $NiCO_3\cdot 2Ni(OH)_2$ $4H_2O$, $NiC_2O_2\cdot 2H_2O$, $Ni(NO_3)_2\cdot 6H_2O$, $NiSO_4$, $NiSO_4\cdot 6H_2O$, a fatty acid nickel salt, nickel halide, or a combination thereof, but the nickel-containing material is not limited thereto.

In the method for preparing a cathode active material according to the present disclosure, the cobalt-containing material may include a cobalt-containing acetate, nitrate, sulfate, halide, sulfide, hydroxide, oxide or oxyhydroxide. For example, the cobalt-containing material may be $Co(OH)_2$, CoOOH, $Co(OCOCH_3)_2\cdot 4H_2O$, $Co(NO_3)_2\cdot 6H_2O$, $CoSO_4$, $Co(SO_4)_2\cdot 7H_2O$, or a combination thereof, but the cobalt-containing material is not limited thereto.

In the method for preparing a cathode active material according to the present disclosure, the manganese-containing material may be manganese-containing acetate, nitrate, sulfate, halide, sulfide, hydroxide, oxide, or oxyhydroxide. For example, the manganese-containing material may be $Mn_2O_3$, $MnO_2$, $Mn_3O_4$, $MnCO_3$, $Mn(NO_3)_2$, $MnSO_4$, manganese acetate, manganese dicarboxylate, manganese citrate, and a fatty acid manganese salt, manganese oxyhydroxide; manganese chloride, or a combination thereof, but the manganese-containing material is not limited thereto.

In the method for preparing a cathode active material according to the present disclosure, the pH adjuster may be NaOH, $NH_4OH$, KOH, or a combination thereof, but the pH adjuster is not limited thereto.

In the method for preparing a cathode active material according to the present disclosure, the reaction solution may be pH 10 to 12 in step (C).

In the method for preparing a cathode active material according to the present disclosure, the method may further include, after step (D), drying the metal composite hydroxide for 24 hours or more in an oven at 100 to 200° C., preferably 150° C., to adjust the moisture content to 0.1 wt % or less.

In the method for preparing a cathode active material according to the present disclosure, the lithium source may be a lithium-containing carbonate (e.g., lithium carbonate), a lithium-containing hydrate (e.g., lithium hydroxide hydrate ($LiOH\cdot H_2O$)), a lithium-containing hydroxide (e.g., lithium hydroxide), a lithium-containing nitrate (e.g., lithium nitrate ($LiNO_3$)), or a lithium-containing chloride (such as lithium chloride (LiCl)), or a combination thereof, but the lithium source is not limited thereto.

In the method for preparing a cathode active material according to the present disclosure, the firing may be performed at 600-1000° C. for 5-30 hours in step (F).

In the method for preparing a cathode active material according to the present disclosure, an M raw material may be further mixed as needed in step (E).

The following is a third embodiment.

The present disclosure provides a cathode for a lithium secondary battery, the cathode containing a cathode active material with improved capacity characteristics and lifespan characteristics.

The cathode active material may have an orientation formed by firing a density gradient precursor, by which the density gradually changes from the inside to the outside of the secondary particle formed of the aggregation of the primary particles.

In the cathode for a lithium secondary battery according to the present disclosure, the cathode may further contain a conductive material or a binder. For example, the cathode may be manufactured by dissolving or dispersing a cathode active material, a conductive material, and/or a binder in a solvent to prepare a cathode mixture, applying the cathode mixture to at least one surface of a cathode current collector, followed by drying or compressing, or may be manufactured by casting the cathode mixture on a separate support and laminating a film obtained by exfoliating the support on the cathode current collector. In such a case, the cathode current collector is not particularly limited so long as the cathode current collector has conductivity without causing chemical changes in a battery. For example, stainless steel, aluminum, nickel, titanium, fired carbon, or aluminum or stainless steel that is surface treated with carbon, nickel, titanium, silver, or the like may be used for the cathode current collector. In addition, the cathode current collector may typically have a thickness of 3 μm to 500 μm, and microscopic irregularities may be formed on the surface of the collector to enhance the adhesion of the cathode active material. The cathode current collector, for example, may be used in various forms, such as a film, a sheet, a foil, a net, a porous body, a foam body, and a non-woven fabric body.

The conductive material is used to provide conductivity to the cathode, and any conductive material that does not cause chemical changes and electron conductivity in the configured battery may be used. Specific examples of the conductive material may include: graphite, such as natural graphite, artificial graphite; carbon-based materials, such as carbon black, acetylene black, Ketjen black, channel black, furnace black, lamp black, thermal black, and carbon fibers; a powder or a fiber of a metal, such as copper, nickel, aluminum, and silver; conductive whiskers, such as zinc oxide and potassium titanate; conductive metal oxides, such as titanium oxide; or conductive polymers, such as polyphenylene derivatives, and one alone or a mixture of two or more of the above materials may be used. The conductive material may be typically contained in an amount of 1 wt % to 30 wt % relative to the total weight of the cathode active material layer.

The binder serves to enhance the binding between the cathode active material particles and the adhesion between the cathode active material and the current collector. Specific examples of the binder may include polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and one alone and a mixture of two or more of these may be used. The binder may be contained in a content of 1 wt % to 30 wt % relative to the total weight of the cathode active material layer.

A solvent that is used in the preparation of a cathode mixture may be a solvent that is commonly used in the art, and examples thereof may include dimethyl sulfoxide (DMSO), isopropyl alcohol, N-methyl pyrrolidone (NMP), acetone, water, and the like, and these may be used alone or as a mixture thereof. The amount of the solvent used may be appropriately adjusted in consideration of the application thickness of a slurry, preparation yield, viscosity, and the like.

The following is a fourth embodiment.

The present disclosure provides a lithium secondary battery that includes a cathode containing a cathode active material with improved capacity characteristics and lifespan characteristics, a cathode containing a cathode active material, an anode containing an anode active material, a separator interposed between the cathode and the anode, and an electrolyte supported between the cathode and the anode.

The cathode active material may have an orientation formed by firing a density gradient precursor, by which the density gradually changes from the inside to the outside of the secondary particle formed of the aggregation of the primary particles.

In the lithium secondary battery according to the present disclosure, the anode, like the cathode, may be prepared by directly coating an anode active material on a copper current collector, or by casting an anode active material on a separate support and laminating, on a copper current collector, the anode active material film released from the support. As the anode active material, a material enabling the intercalation/de-intercalation of lithium may be used. Examples thereof may include a lithium metal or lithium alloy, coke, artificial graphite, natural graphite, organic polymer compound combustion body, carbon fiber, and the like. In addition, the conductive material and binder may be used in the same manner as in the anode described above.

In the lithium secondary battery according to the present disclosure, any separator that can be commonly used in a lithium secondary battery may be used as the separator. For example, polyethylene, polypropylene, polyvinylidene fluoride, or a multilayer with at least two layers thereof may be used, or a mixed multilayer, such as a two-layer separator of polyethylene/polypropylene, a three-layer separator of polyethylene/polypropylene/polyethylene, or a three-layer separator of polypropylene/polyethylene/polypropylene, may be used. Examples of the electrolyte may be a non-aqueous electrolyte, a known solid electrolyte, or the like, and an electrolyte in which a lithium salt is dissolved may be used. The solvent of the non-aqueous electrolyte is not particularly limited, but examples thereof may include: cyclic carbonates, such as ethylene carbonate, propylene carbonate, butylene carbonate, and vinylene carbonate; chain carbonates, such as dimethyl carbonate, methyl ethyl carbonate, and diethyl carbonate; esters, such as methyl acetate, ethyl acetate, propyl acetate, methyl propionate, ethyl propionate, and γ-butyrolactone; ethers, such as 1,2-dimethoxyethane, 1,2-diethoxyethane, tetrahydrofuran, 1,2-dioxane, and 2-methyl tetrahydrofuran; nitriles such as acetonitrile; amides such as dimethylformamide, and the like. These may be used alone or in a combination of two or more. Mixture solvents with cyclic carbonates and chain carbonates may be preferably used.

Hereinafter, the present disclosure will be described in detail with reference to examples and test examples. However, the following examples and test examples are merely for illustrating the present disclosure, and the examples are not intended to limit the scope of the present disclosure.

EXAMPLES

Example 1: Preparation of Cathode Active Material for Lithium Battery Having Oriented Structure In a 100 L batch reactor, water was added at 15% relative to the total volume of the reactor, and 0.3 parts by weight of xylitol relative to 100 parts by weight of water was added to the reactor. With stirring at a rate of 400 rpm, the inner temperature was set to 30-50° C., and a nitrogen gas was added to the reactor to perform an adjustment to an inert atmosphere. Then, a 2.5 M metal sulfate aqueous solution in which nickel sulfate, cobalt sulfate, and manganese sulfate were mixed at a molar ratio of 0.8:0.1:0.1, 25% sodium hydroxide, and 28% ammonia water were prepared. The flow rate of the metal sulfate aqueous solution was adjusted to 3 L/hour, and the flow rate of the ammonia water was adjusted to a ratio of 0.04 to the flow rate of the metal aqueous solution; and the dose of a sodium hydroxide (NaOH) solution was adjusted so that the hydrogen ion concentration (pH) in the reactor was about 10.5 to 11.5. The reactants were added so that the stirring rate was 400 ppm and the average retention time of the entire solution was 20 hours, and the reaction temperature was maintained at 30° C.-50° C., and an inert atmosphere was maintained by addition of nitrogen gas. The solution obtained after the completion of the reaction was washed and solid-liquid separated by using a filter press, and the residual moisture was removed using high-pressure fresh air. The solid-liquid separated active material was dried at 100 to 200° C. by using a fluidized bed dryer.

Lithium hydroxide was mixed with the obtained hydroxide particles such that the equivalent ratio of lithium hydroxide and the hydroxide particles was 1.025. Therefore, the mixture was heated at a temperature rise rate of 2.5° C./min in an oxygen atmosphere and then fired at 780° C. for 9 hours, thereby preparing a lithium composite metal oxide having a uniform oriented structure.

Example 2: Preparation of Cathode Active Material for Lithium Battery Having Oriented Structure In a 100 L batch reactor, water was added at 15%, and with stirring at a rate of 400 rpm, the inner temperature was set to 30-50° C., and a nitrogen gas was added to the reactor to perform an adjustment to an inert atmosphere. A 2.5 M metal sulfate aqueous solution in which nickel sulfate, cobalt sulfate, and manganese sulfate were mixed at a molar ratio of 0.8:0.1:0.1, 25% sodium hydroxide, and 28% ammonia water were prepared. The flow rate of the metal sulfate aqueous solution was adjusted to 3 L/hour, and the flow rate of the ammonia water was adjusted to a ratio of 0.04 to the flow rate of the metal aqueous solution. The dose of a sodium hydroxide (NaOH) solution was adjusted so that the hydrogen ion concentration (pH) in the reactor was about 10.5 to 11.5. Specifically, xylitol was added at 0.1 parts by weight relative to 100 parts by the transition metals, to the reactor. The reactants were added so that the stirring rate was 400 ppm and the average retention time of the entire solution was 20 hours, and the reaction temperature was maintained at 30° C.-50° C., and an inert atmosphere was maintained by addition of nitrogen gas. The solution obtained after the completion of the reaction was washed and solid-liquid separated by using a filter press, and the residual moisture was removed using high-pressure fresh air. The solid-liquid separated active material was dried at 100 to 200° C. by using a fluidized bed dryer.

Lithium hydroxide was mixed with the obtained hydroxide particles such that the equivalent ratio of lithium hydroxide and the hydroxide particles was 1.05. Thereafter, the mixture was heated at a temperature rise rate of 2.5° C./min in an oxygen atmosphere and then fired at 780° C. for 9 hours, thereby preparing a lithium composite metal oxide having a uniform oriented structure.

Comparative Example 1: Preparation of Cathode Active Material for Lithium Battery In a 100 L batch reactor, water was added at 15%, and with stirring at a stirring rate of 400 rpm, the inner temperature was set to 30-50° C., and a nitrogen gas was added to the reactor to perform an adjustment to an inert atmosphere. A 2.5 M metal sulfate aqueous solution in which nickel sulfate, cobalt sulfate, and manganese sulfate were mixed at a molar ratio of 0.8:0.1:0.1, 25% sodium hydroxide, and 28% ammonia water were prepared. The flow rate of the metal sulfate aqueous solution was adjusted to 3 L/hour, and the flow rate of the ammonia water was adjusted to a ratio of 0.04 to the flow rate of the metal aqueous solution. The dose of a sodium hydroxide (NaOH) solution was adjusted so that the hydrogen ion concentration (pH) in the reactor was about 10.5 to 11.5. The reactants were added so that the stirring rate was 400 ppm and the average retention time of the entire solution was 20 hours, and the reaction temperature was maintained at 30° C.-50° C., and an inert atmosphere was maintained by addition of nitrogen gas. The solution obtained after the completion of the reaction was washed and solid-liquid separated by using a filter press, and the residual moisture was removed using high-pressure fresh air. The solid-liquid separated active material was dried at 100 to 200° C. by using a fluidized bed dryer.

Lithium hydroxide was mixed with the obtained hydroxide particles such that the equivalent ratio of lithium hydroxide and the hydroxide particles was 1.05, and thereafter, the mixture was heated at a temperature rise rate of 2.5° C./min in an oxygen atmosphere and then fired at 780° C. for 9 hours, thereby preparing a lithium composite metal oxide having a uniform oriented structure.

Test Example

Figure 7:
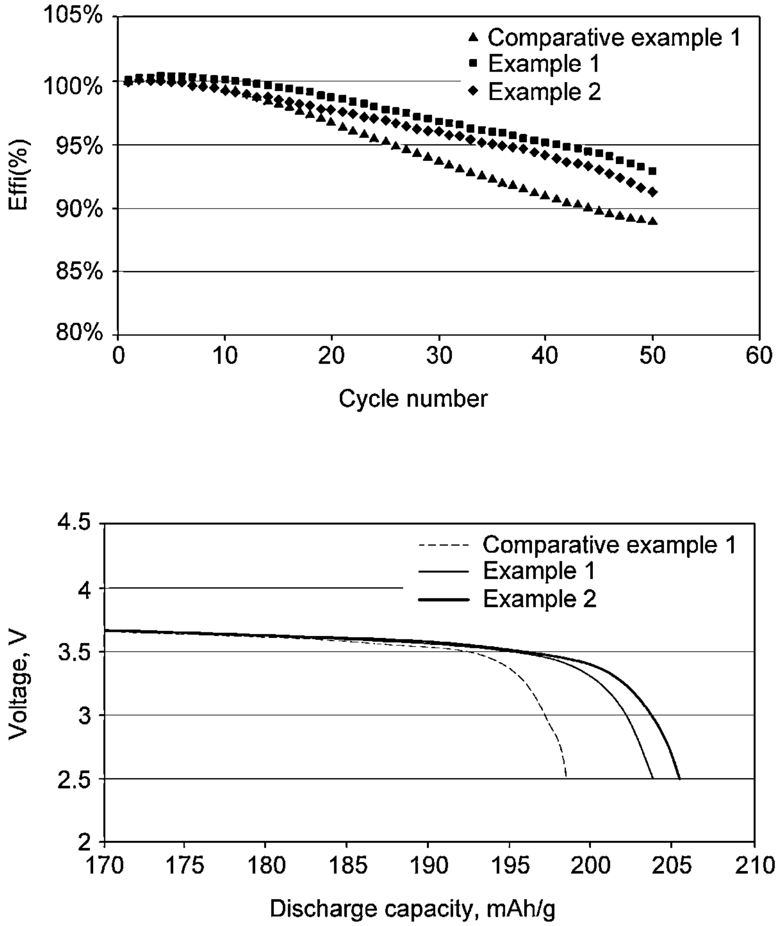
FIG. 7 shows graphs illustrating capacity characteristics and lifespan characteristics of active materials for a lithium secondary battery according to Comparative Example 1 and Examples 1 and 2.

Test Example 1: Particle Cross-Section Analysis and Coin-Cell Evaluation of Cathode Active Material Having Oriented Structure for Lithium Battery As shown in FIG. 7, compared with Comparative Example 1 with no orientation, the cathode active materials of Examples 1 and 2 having an orientation have significantly improved in lifespan characteristics and capacity characteristics.

As set forth above, the present disclosure has been described with reference to some embodiments. A person skilled in the art to which the present disclosure pertain would understand that the present disclosure could be implemented in a modified form without departing from the inherent characteristics of the present disclosure. Accordingly, the embodiments described herein should be considered from an illustrative aspect rather than from a restrictive aspect. The scope of the present disclosure should be defined not by the detailed description but by the appended claims, and all differences falling within a scope equivalent to the claims should be construed as being included in the present disclosure.

The invention claimed is:

1. A cathode active material comprising:

a lithium-nickel composite oxide, wherein the cathode active material comprises:

a secondary particle formed from an aggregate of primary particles and a particle shape controller that is xylitol, wherein the secondary particles have an orientation formed from a density gradient that is diffused from an inside to an outside by the particle shape controller.

2. The cathode active material of claim 1, wherein the orientation is formed by firing a density gradient precursor, by which the density gradually changes from the inside of the secondary particle to the outside of the secondary particle formed of the aggregate of the primary particles.

3. The cathode active material of claim 1, wherein the primary particles have a plate-shaped, needle-shaped, or amorphous particle form.

4. The cathode active material of claim 1, wherein the secondary particle has a specific surface area of 1 to 30 $m^2/g$ and an average particle diameter ($D_{50}$) of 2 to 20 μm.

5. The cathode active material of claim 1, wherein the lithium-nickel composite oxide is represented by:

$$Li_x[Ni_yCo_zMn_wM_v]O_2;$$

where M is at least one selected from Ba, Ca, Zr, Ti, Mg, Ta, Nb, and Mo; and $0.9<x<1.2$, $0.8<y<1$, $0<z<0.08$, $0<w<0.05$, and $0 \leq v \leq 0.2$.

6. A method for preparing the cathode active material of claim 1, the method comprising:

(A) preparing a metal salt mixed aqueous solution containing a nickel-containing material, a cobalt-containing material, and a manganese-containing material;

(B) adding, to a reactor, a reaction solution containing the metal salt mixed aqueous solution and a complex ion former;

(C) adding a pH adjuster to the reaction solution in an inert atmosphere to adjust pH;

(D) filtering the reaction solution to obtain a metal composite hydroxide;

(E) mixing the metal composite hydroxide with a lithium source to prepare a cathode active material precursor; and (F) firing the cathode active material precursor, wherein step (A), (B), or (C) further comprises the particle shape controller that is the xylitol, and the cathode active material is formed by firing a density gradient precursor, wherein the cathode active material has an orientation where the density gradually changes from the inside of the secondary particle to the outside of the secondary particle formed of the aggregate of primary particles.

7. The method of claim 6, wherein in step (F), the firing is performed at 600-1000° C. for 5-30 hours.

8. The cathode active material of claim 1, wherein a density continuously changes throughout the secondary particle from the inside to the outside.

* * * * *